United States Patent
Shea

(10) Patent No.: US 10,766,623 B2
(45) Date of Patent: Sep. 8, 2020

(54) OZONE CONVERTER BYPASS

(71) Applicant: HAMILTON SUNDSTRAND CORPORATION, Windsor Locks, CT (US)

(72) Inventor: Brian R. Shea, Windsor, CT (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 286 days.

(21) Appl. No.: 15/340,662

(22) Filed: Nov. 1, 2016

(65) Prior Publication Data
US 2018/0118352 A1   May 3, 2018

(51) Int. Cl.
| | |
|---|---|
| *B64D 13/06* | (2006.01) |
| *B01D 53/86* | (2006.01) |
| *B01J 19/24* | (2006.01) |
| *B64D 13/02* | (2006.01) |
| *B64D 13/08* | (2006.01) |
| *C01B 13/02* | (2006.01) |
| *B01D 53/88* | (2006.01) |

(52) U.S. Cl.
CPC ......... *B64D 13/06* (2013.01); *B01D 53/8675* (2013.01); *B01J 19/24* (2013.01); *B64D 13/02* (2013.01); *B64D 13/08* (2013.01); *C01B 13/0203* (2013.01); *B01D 53/885* (2013.01); *B01D 2255/1023* (2013.01); *B01D 2258/06* (2013.01); *B01D 2259/4575* (2013.01); *B01J 2219/00164* (2013.01); *B01J 2219/24* (2013.01); *B64D 2013/0685* (2013.01)

(58) Field of Classification Search
CPC ........ B64D 13/06; B64D 13/02; B64D 13/08; B01J 19/24; B01D 53/8675; C01B 13/0203

See application file for complete search history.

(56) References Cited

U.S. PATENT DOCUMENTS

| | | | | |
|---|---|---|---|---|
| 2,267,738 | A | * 12/1941 | Kaufman | F24F 5/0017 62/313 |
| 3,401,624 | A | * 9/1968 | Mohrman | F24F 7/025 454/344 |
| 7,010,106 | B2 | 3/2006 | Gritzer et al. | |
| 9,056,276 | B2 | 6/2015 | Army et al. | |
| 9,133,028 | B2 | 9/2015 | Army et al. | |
| 2013/0094999 | A1 | 4/2013 | Army et al. | |

FOREIGN PATENT DOCUMENTS

| | | |
|---|---|---|
| CN | 204447752 U | 7/2015 |
| JP | 2009206474 | 9/2009 |
| JP | 2010173258 A | 8/2010 |
| WO | 9403265 A1 | 2/1994 |

OTHER PUBLICATIONS

European Search Report for Application No. 17199206.8-1104 dated Apr. 6, 2018, 10 pages.

* cited by examiner

*Primary Examiner* — Regina M Yoo
(74) *Attorney, Agent, or Firm* — Cantor Colburn LLP

(57) ABSTRACT

An ozone converter includes an outer housing having an inlet and an outlet and a core disposed within the outer housing, the core including a central passageway formed therein and passing thorough the core. The converter also includes an ozone control assembly that allows air to pass through the central passageway in an closed mode and prevents flow thorough the central passageway in an open mode, the assembly including cover flaps that cover a portion of the core in the closed mode and that do not cover the core in the open mode.

5 Claims, 8 Drawing Sheets

OZONE CONVERTER BYPASS

BACKGROUND OF THE INVENTION

The subject matter disclosed herein relates to an ozone converter and in particular to an ozone converter for use with an aircraft environmental control system.

Aircraft have power systems that are comprised of several components, such as an engine, an environmental control system and a thermal management system. These systems are designed relatively independently from each other with power being transferred from one system to another.

The environmental control system supplies pressurized air to the cabin and flight deck of an aircraft. The ambient air is drawn either from the compressor stage of an engine (a bleed air system) or a dedicated compressor. At high altitude (e.g., greater than 20,000 ft (6096 m)), the ambient air contains unacceptable levels of ozone ($O_3$). Passenger comfort and/or compliance with regulations or agreements can limit the amount of ozone provided to the cabin and flight deck. As such, commercial aircraft generally include an ozone converter that converts ozone to oxygen ($O_2$).

Ozone converters typically include an ozone-converting core (core) that includes a catalyst which causes the ozone to decompose to oxygen. To minimize the core's exposure to contamination and extend the life of the converter, air is externally bypassed around the converter when the aircraft is at low altitude. However, in some cases, there is no space available to incorporate an external bypass.

BRIEF DESCRIPTION OF THE INVENTION

According to one embodiment, an ozone converter that includes an outer housing having an inlet and an outlet and a core disposed within the outer housing, the core including a central passageway formed therein and passing thorough the core is disclosed. The converter also includes an ozone control assembly that allows air to pass through the central passageway in an closed mode and prevents flow thorough the central passageway in an open mode, the assembly including cover flaps that cover a portion of the core in the closed mode and that do not cover the core in the open mode.

In one or more embodiments, the converter includes an actuator that causes the flaps to move when the converter is changed from the closed mode to the open mode or from the open mode to the closed mode.

The ozone converter is in an aircraft and is in the closed mode when the aircraft is on the ground.

In one or more embodiments, the ozone control assembly includes: a rod that is controlled by the actuator; and a central passageway access cover connected to the rod and the flaps are connected to the rod.

In one or more embodiments, the flaps are arranged perpendicular to the central passageway access cover.

In one or more embodiments, the central passageway access cover prevent flow through the central passageway in the open mode and allows flow through the central passageway in the closed mode.

In one or more embodiments, the actuator causes the rod rotate to change the converter from the closed mode to the open mode or from the open mode to the closed mode.

According to one embodiment, an ozone converter that includes an outer housing having an inlet and an outlet and a core disposed within the outer housing, the core including one or more passageways formed therein and passing thorough the core is disclosed. The converter also includes an ozone control assembly that allows air to pass through the passageways in an closed mode and prevents flow thorough the passageways in an open mode, the assembly including a rotatable blocking element that covers the passageways in the closed mode and that do not cover the passageways in the open mode.

In one or more embodiments, the converter also includes an actuator that causes the blocking element to rotate about a central axis that is parallel to a longitudinal access of the converter.

In one or more embodiments, the ozone converter is in an aircraft and is in the open mode when the aircraft is on the ground.

In one or more embodiments, the rotatable cover element is disposed upstream of the core.

In one or more embodiments, rotatable blocking element includes holes that are aligned with the one or more passageways in the open mode.

In one or more embodiments, the actuator causes the rotatable blocking element to change the converter from the closed mode to the open mode or from the open mode to the closed mode by rotating the rotatable blocking element.

BRIEF DESCRIPTION OF THE DRAWINGS

The subject matter which is regarded as the invention is particularly pointed out and distinctly claimed in the claims included at the conclusion of the specification. The foregoing and other features, and advantages of the invention are apparent from the following detailed description taken in conjunction with the accompanying drawings in which:

DETAILED DESCRIPTION OF THE INVENTION

Figure 1:
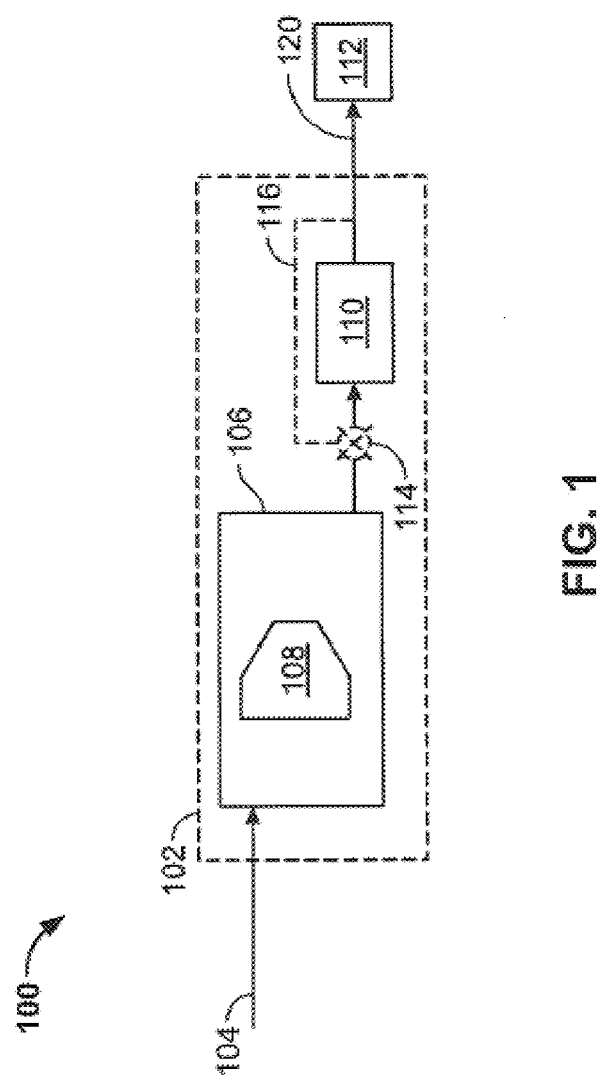
FIG. 1 is a block diagram illustrating a system in which embodiments of the present invention can be implemented.

FIG. 1 illustrates a system 100 in which embodiments of the present invention may be implemented. The system 100 can be part of an aircraft or any other type of apparatus that can cause the system 100 to be moved in a forward direction. For clarity, the following description will assume that the system 100 is part of an aircraft but it is not so limited.

The system 100 illustrated in FIG. 1 includes an environmental control system (ECS) 102. The ECS 102 receives input air 104 and provides output air 120 to a location 112 within an apparatus. For example, the location 112 could be the flight deck or passenger compartment of an aircraft. It shall be understood that the ECS 102 shown in FIG. 1 is extremely simplified and could include many other or different elements.

As illustrated, the ECS 102 includes an air parameter adjusting unit 106. The air parameter adjusting unit 106, generally, converts the pressure and/or temperature of the input air 104 to a desired level. In one embodiment, the input air 104 is bleed air from a compressor section of an engine. In another embodiment, the input air 104 is ram air received directly from the atmosphere. Regardless of the source of the input air 104, the air parameter adjusting unit 106 may include a parameter adjustment device 108 that can be operated to adjust the temperature/pressure of the input air 104. The parameter adjustment device 108 can be a valve, a turbine, a compressor or device that includes both. In one embodiment, the parameter adjustment device 108 is an electric compressor that compresses ram air.

If the input air 104 is received while the aircraft is at high altitude, there may a requirement (e.g., contractual or regulatory) that ozone be removed from the input air 104 before being provided to location 112 as output air 120. To that end, the ECS 102 also includes an ozone converter 110 coupled between the air parameter adjusting unit 106 and the location 112. The exact location of the ozone converter 110 can be varied from that shown in FIG. 1 in different embodiments of the present invention.

As discussed above, in some cases it may be desirable to bypass the ozone converter 110 when the ECS 102 receives input air 104 from a low altitude source. To accomplish this, one prior art approach was to include bypass line 116 and diverter 114 that caused the input air 104 to be bypassed around the ozone converter 110. In FIG. 1, bypass line 116 and diverter 114 are shown in dashed line to indicate that they are not required (or even desired) components of the ECS 102 according to one embodiment.

Embodiments of the present invention are directed to an ozone converter 110 that can be used in the system 100. According to one embodiment, the ozone converter 110 includes an internal bypass that allows air to bypass portions of the ozone converter's core without requiring a separate external bypass (e.g., without requiring either diverter 114 or bypass line 116). Such an embodiment, as discussed below includes, one or more actuating panels (or vanes) that can either lie flat against the face of the ozone converter core or be actuated to be parallel to the flow, thereby exposing more of the face of the ozone converter core to the flow. An additional center bypass can be contained on the same shaft allowing for center core bypass when the panels are closed, and then actuating to block the bypass when the panels are open.

In another embodiment, a rotating panel that is placed in front of the ozone convertor core covering or uncovering portions of the ozone convertor core based on an actuator position. In the "open" position a flow is allowed to flow through large bypass sections reducing pressure drop and also serving to isolate sections from contaminants. In the "closed" position which would be used at higher altitudes, the solid portions of the panel cover the bypass slots and allow the air flow through sections of the ozone convertor core.

Of course, the inclusion of diverter 114 or bypass line 116 into ECS 102 does not change the fact that any system that includes an ozone converter 110 as disclosed herein is within the scope of the present invention. In some cases, the ozone converter 110 can save space in ECS 102 because diverter 114 and bypass line 116 are not required. Removal of such elements may provide a space saving that exceeds any increase in size of the ozone converter 110 due to the provision on an internal bypass within the ozone converter 110 as disclosed herein.

In prior art applications, the ozone converted included a housing formed of a metal such as titanium. The housing is typically formed of two portions that are welded together after the core is inserted. This is not required, however.

Figure 2:
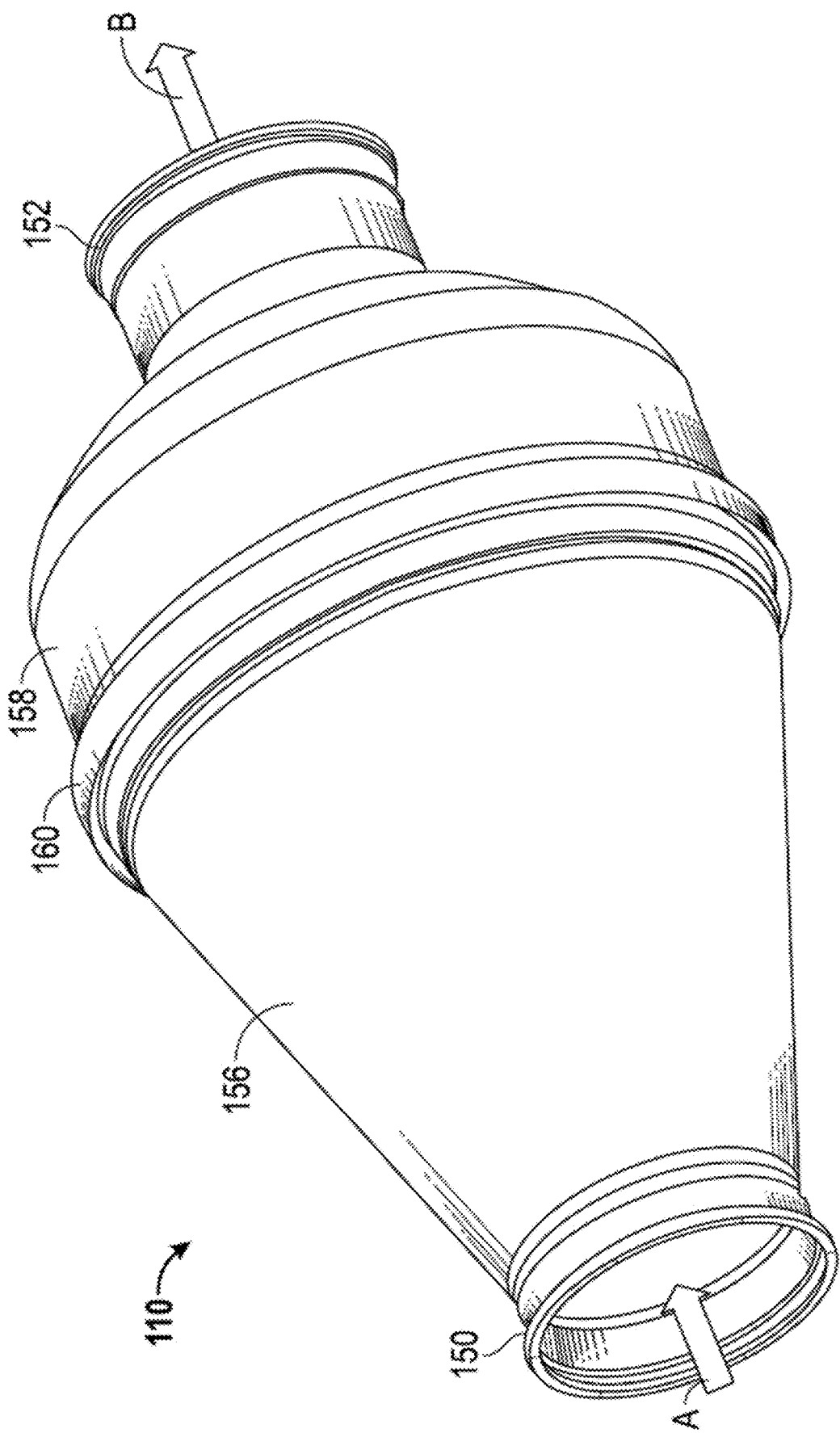
FIG. 2 is a perspective view of an ozone converter according to one embodiment of the present invention.

FIG. 2 shows a perspective view of an example of an ozone converter 110 according to embodiment. The ozone converter 110 includes an inlet 150 into which inlet air A enters the ozone converter 110 and an outlet 152 through which outlet air B exits the ozone converter 110. Some or all of the ozone contained in inlet air A is removed in the ozone converter 110 such that the outlet air B has less ozone in it that the inlet air A. To this end, the ozone converter 110 includes a core 162 (FIG. 3) that removes some or all of the ozone from the inlet air A to produce outlet air B.

Enclosed within the outer shell is a core. Two different cores will be discussed herein. Each of the cores can be formed of any type of material that causes or otherwise aids in the conversion of ozone into oxygen. For instance, in one embodiment, the core is formed at least partially of palladium.

Figure 3:
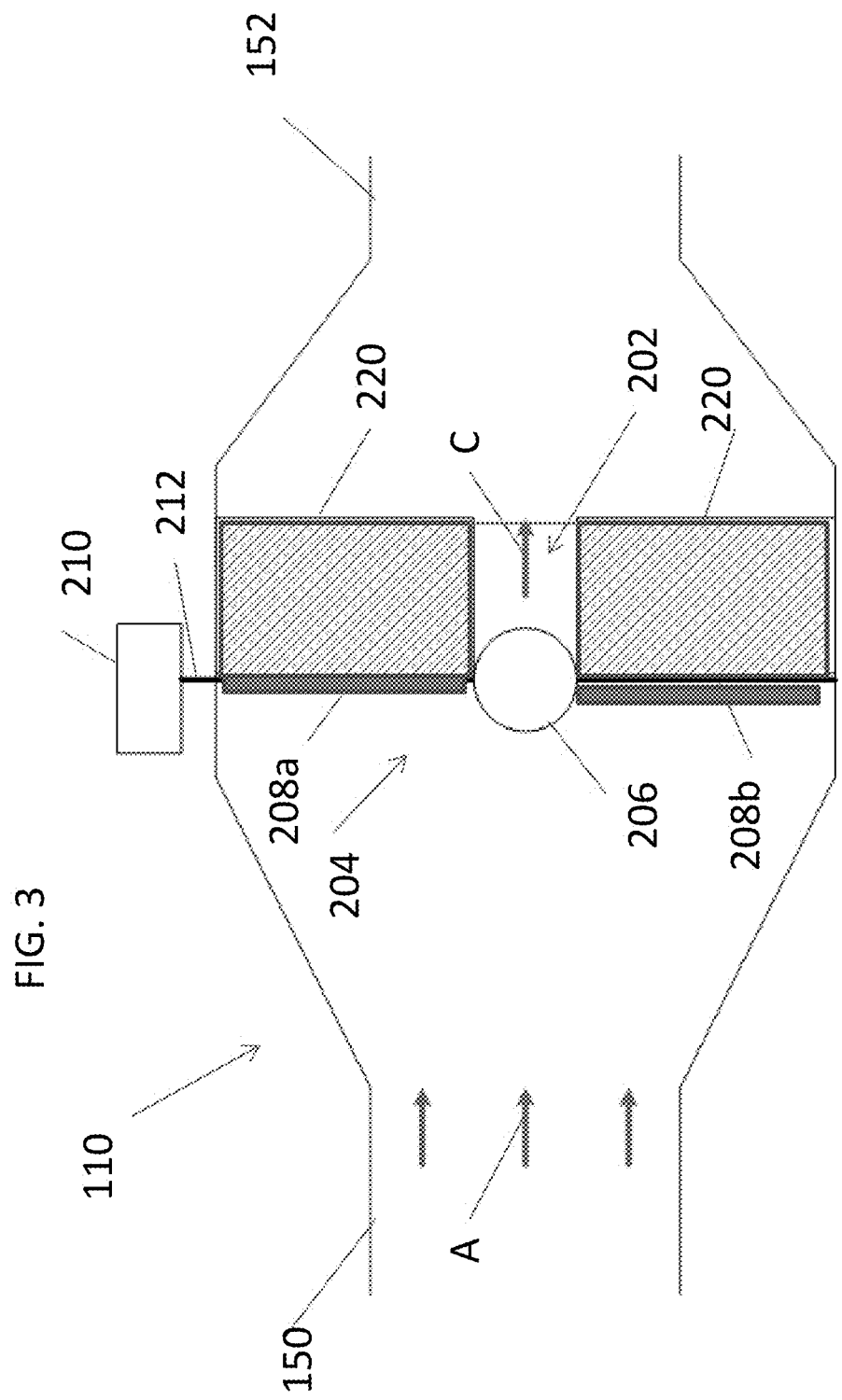
FIG. 3 is cut-away side view of an ozone converter having an internal bypass in the open position according to one embodiment of the present invention.

FIG. 3 is cross-section of an example ozone converter taken along its core. While labelled as converter 110 it shall be understood that the converter is not limited in shape, size or dimension to that shown above and need only include an inlet 150, an outlet 152 and an outer housing.

The core 220 is show as being circular and having a passageway 202 formed through it. The passageway 202 may be referred to as a central passageway 202 herein. The ozone converter 110 includes an actuator 210 that drives an ozone control assembly. The ozone control assembly 204, in operation, controls a flow of air (A) through the core 220. The control may be partial or complete. For example, in one embodiment, the ozone control assembly 204 includes a control rod 212 having at least a central passageway access cover 206 and one or more core cover flaps 208a, 208b, etc. attached to it. As shown, the control assembly is in a "closed" or ground/low altitude mode. In this mode, air A is allowed to pass through the central passageway 202 without passing through the core 220. Some air may pass through the core as well. However, a portion of the core is not allowed to have air pass through it as it is covered by core cover flaps 208a, 208b.

Figure 4:
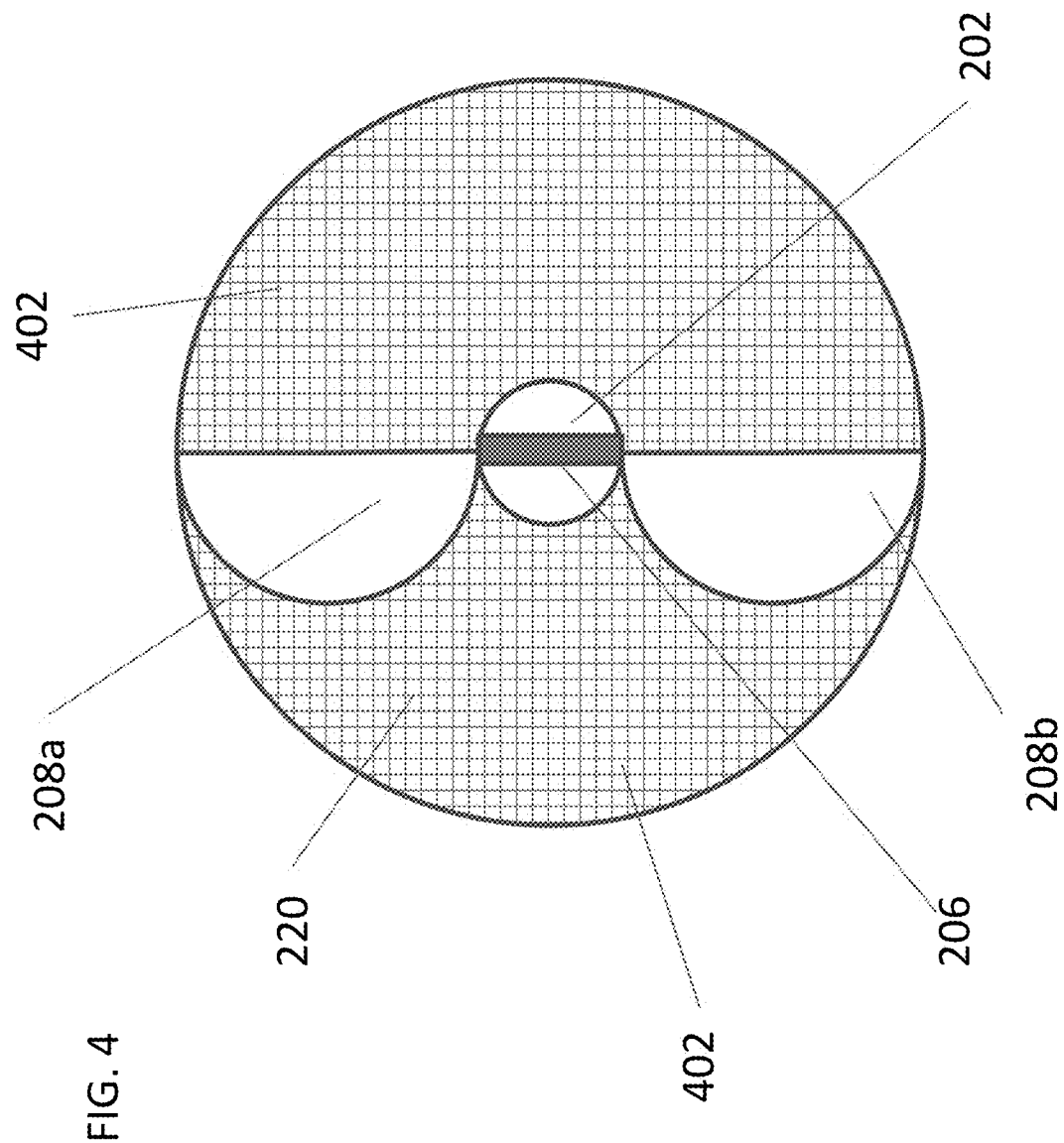
FIG. 4 is an end view taken in the airflow direction through of the ozone converter of the flaps and the core shown in FIG. 3.

FIG. 4 shows a view of the core 220 in the direction of the airflow A from FIG. 3. In FIG. 4, the assembly 204 of FIG. 3 is in the ground mode that allows air to pass through the central opening 206 as well as portions of the core that are not covered by the flaps 208, 208b. Such areas in the core 220 are denoted by reference numeral 402 in FIG. 4.

Figure 5:
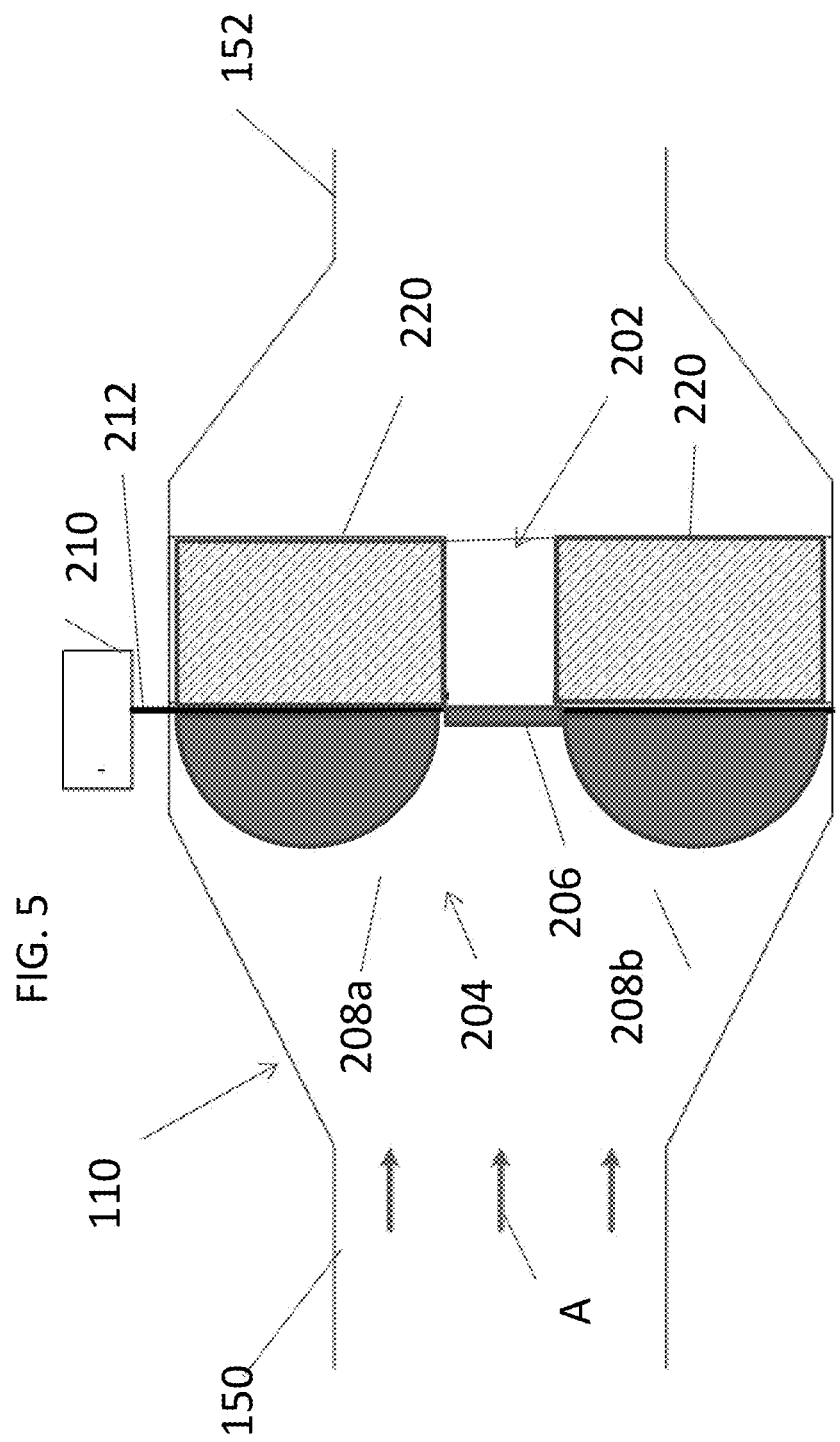
FIG. 5 is cut-away side view of an ozone converter having an internal bypass in the closed position according to one embodiment of the present invention.

Rotation of the control rod 212 of FIG. 3 will cause the central passageway access cover 206 and the flaps 208a, 208b to rotate into the position shown in FIG. 5. In this state, and as indicated by the absence of arrow C in FIG. 5, air is prevented from passing through the central passageway 202 by central passageway access cover 206. Further, the flaps 208a, 208b do not impede flow any portions of the core except along the rod 212. In this manner, all air A is forced to pass through the core 220. The rod 212 rotates about axis that is perpendicular to the direction of the flow of airflow A.

In another embodiment, rather than having rotation of an airflow assembly in about an axis that is perpendicular to the flow of air, the core the blocking elements are arranged such that blocking elements can move in front of or away from openings of the core as they are rotated about an axis this is perpendicular to the air flow direction.

Figure 6:
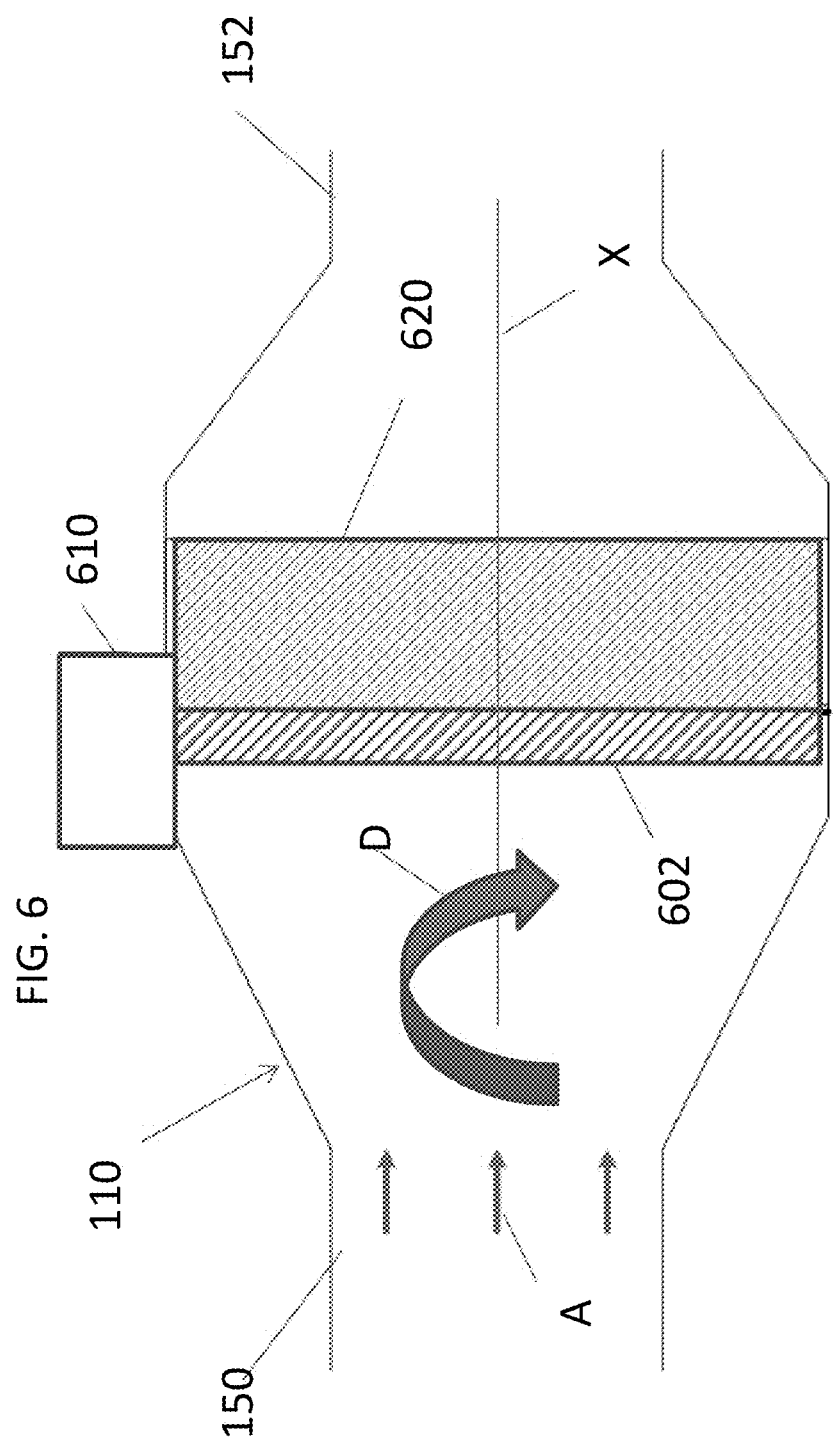
FIG. 6 is cut-away side view of an ozone converter having an internal bypass according to another embodiment of the present invention.

FIG. 6 shows an example of an embodiment that includes a rotatable ozone core blocking element 602. The element 602 can be circular in one embodiment and includes one or holes formed in it to allow air to pass through it. Depending on the position of the element 602, the air will either pass through the core or through holes in the core 620. The core 620 can be any formed of any material disclosed herein or that is effective in converting ozone into oxygen. The element 602 rotates in a circular manner about an axis X of the converter 110. Axis X extends in the same or the same general direction that air flows through the converter 110 (e.g., direction A). The rotation may be controlled by actuator 610 which causes the element 602 to rotate in either direction D or its opposite direction.

Figure 7A:
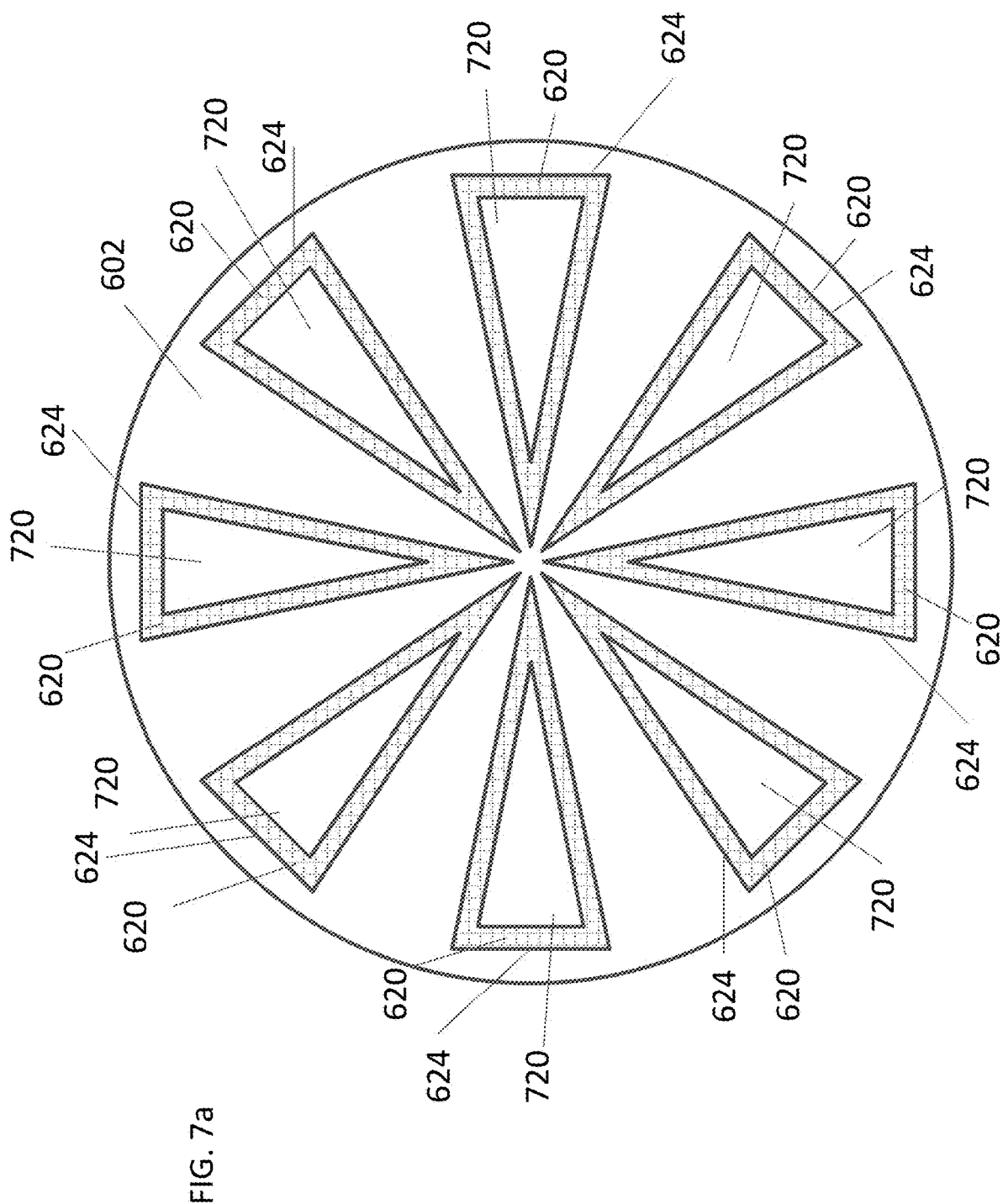
FIG. 7a is an end view taken in the airflow direction through of the ozone converter shown in FIG. 6 when in the open position.
Figure 7B:
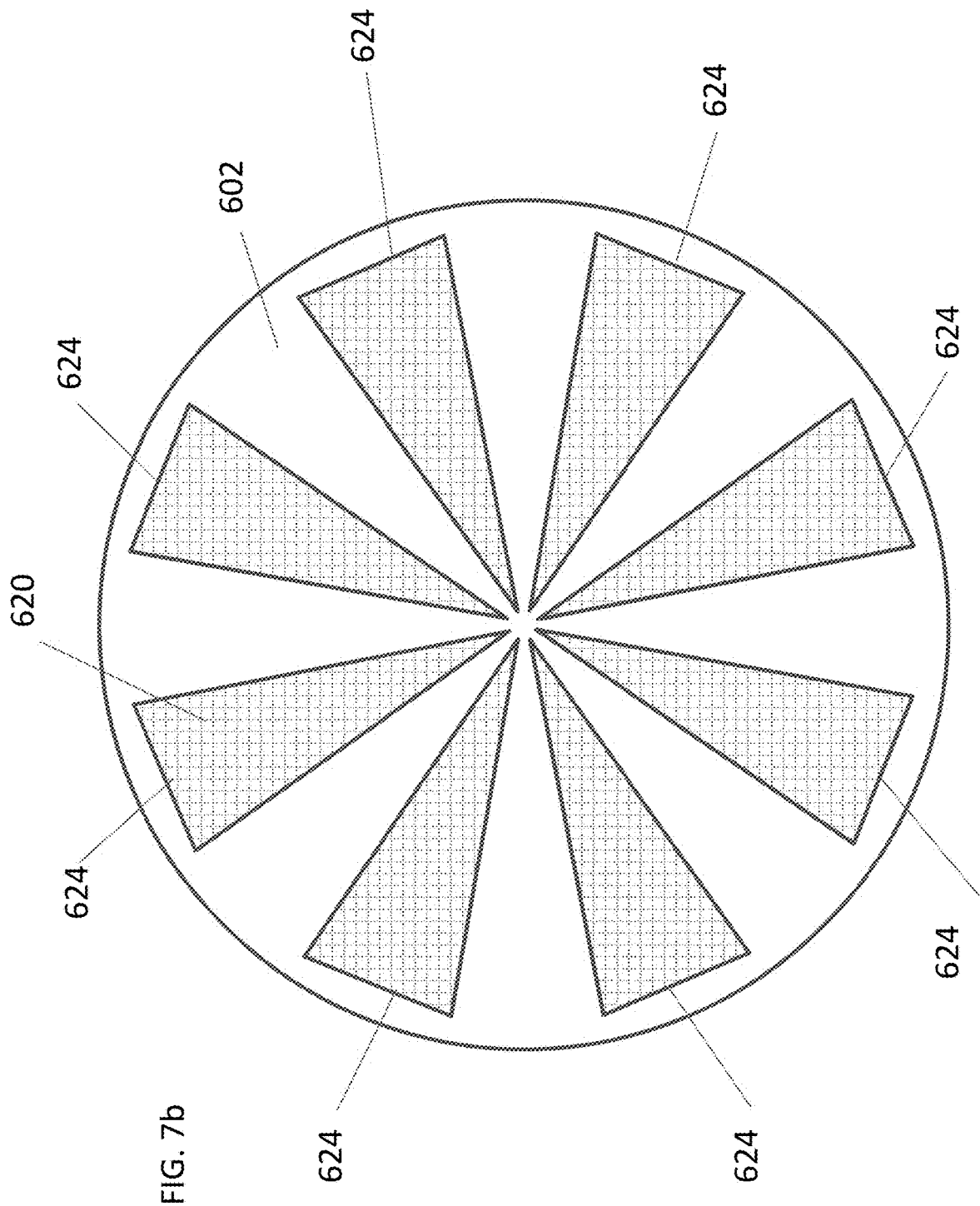
FIG. 7b is an end view taken in the airflow direction through of the ozone converter shown in FIG. 6 when in the closed position.

FIGS. 7a and 7b show an example of a blocking element 602 in an open (e.g., ground or low flight altitude) and closed (e.g., in flight) positions. respectively, relative to the converter core 620. As best seen in FIG. 7a the core 620 is arranged behind (e.g., down stream) of the blocking element 602. The core 620 is illustrated as being formed as a matrix but that is not required. The core 620 includes one or more holes 720 formed therein. As illustrated, the core 620 includes eight holes 720 formed therein. When on the ground, air passes through the holes 720 as the element 602 is arranged to allow for such passes (e.g., it does not cover the holes 720). The blocking element 602 also includes holes 624 that expose the holes 720 in the core 620 to incoming air (e.g, air A in FIG. 6).

As described above, the blocking element 602 can be rotated such that it covers the holes 720 in the core 620. This is illustrated in FIG. 7b. In particular, the holes 624 in the blocking element 602 are not arranged over the over the holes 720 in the core 620. In this manner all or most of the air that passes through ozone converter must pass through the core 620. in FIG. 7a, some or most of the air is allowed to bypass the core 620 and pass through holes 720. This may lower pressure when on the ground, increase core life and/or prevent fouling.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An ozone converter comprising:
an outer housing having an inlet and an outlet;
a core disposed within the outer housing, the core including a central passageway formed therein and passing through the core;
an ozone control assembly that allows air to pass through the central passageway in a closed mode and prevents flow thorough the central passageway in an open mode, the ozone control assembly including cover flaps that cover a portion of the core in the closed mode and that do not cover the core in the open mode; and
an actuator that causes the cover flaps to move when the ozone converter is changed from the closed mode to the open mode or from the open mode to the closed mode;
wherein the ozone control assembly includes:
a rod that is controlled by the actuator; and
a central passageway access cover connected to the rod;
wherein the cover flaps are connected to the rod.

2. The ozone converter of claim 1, wherein the ozone converter is in an aircraft and is in the closed mode when the aircraft is on the ground.

3. The ozone converter of claim 1, wherein the cover flaps are arranged perpendicular to the central passageway access cover.

4. The ozone converter of claim 1, wherein the central passageway access cover prevents flow through the central passageway in the open mode and allows flow through the central passageway in the closed mode.

5. The ozone converter of claim 1, wherein the actuator causes the rod to rotate to change the ozone converter from the closed mode to the open mode or from the open mode to the closed mode.

* * * * *